United States Patent
Deschamps

(10) Patent No.: US 8,994,855 B2
(45) Date of Patent: Mar. 31, 2015

(54) CMOS PIXEL CONTROL METHOD

(71) Applicant: STMicroelectronics (Grenoble 2) SAS, Grenoble (FR)

(72) Inventor: Benoit Deschamps, Sassenage (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 154 days.

(21) Appl. No.: 13/930,874

(22) Filed: Jun. 28, 2013

(65) Prior Publication Data

US 2014/0002705 A1 Jan. 2, 2014

(30) Foreign Application Priority Data

Jul. 2, 2012 (FR) ...................... 12 56319

(51) Int. Cl.
| | |
|---|---|
| H04N 9/64 | (2006.01) |
| H04N 5/217 | (2011.01) |
| H04N 3/14 | (2006.01) |
| H04N 5/355 | (2011.01) |
| H04N 5/359 | (2011.01) |
| H04N 5/335 | (2011.01) |

(52) U.S. Cl.
CPC ............ *H04N 5/335* (2013.01); *H04N 5/2175* (2013.01); *H04N 3/155* (2013.01); *H04N 5/355* (2013.01); *H04N 5/35536* (2013.01); *H04N 5/35554* (2013.01); *H04N 5/35581* (2013.01); *H04N 5/3594* (2013.01)
USPC ......... 348/248; 348/299; 348/314; 250/208.1

(58) Field of Classification Search
CPC . H04N 5/2175; H04N 5/3591; H04N 5/3592; H04N 5/359; H04N 3/1556

USPC ......... 348/248, 314, 296, 294, 299, 300, 308, 348/E05.091; 250/208.1

See application file for complete search history.

(56) References Cited

U.S. PATENT DOCUMENTS

| | | | | |
|---|---|---|---|---|
| 6,963,370 | B2 * | 11/2005 | DiCarlo et al. ............... | 348/297 |
| 7,394,492 | B2 * | 7/2008 | Shinohara ...................... | 348/301 |
| 8,350,942 | B2 * | 1/2013 | Shinohara ...................... | 348/308 |
| 8,773,562 | B1 * | 7/2014 | Fan ................................ | 348/308 |
| 2005/0253945 | A1 * | 11/2005 | Shinohara ...................... | 348/300 |
| 2008/0258045 | A1 * | 10/2008 | Oike et al. ................... | 250/208.1 |
| 2011/0013065 | A1 | 1/2011 | Shinohara | |
| 2012/0075499 | A1 | 3/2012 | Kawaguchi et al. | |
| 2012/0086826 | A1 * | 4/2012 | Masuyama et al. ......... | 348/220.1 |
| 2014/0247378 | A1 * | 9/2014 | Sharma et al. ............... | 348/280 |

FOREIGN PATENT DOCUMENTS

| | | | |
|---|---|---|---|
| EP | 2071825 | A1 | 6/2009 |
| EP | 2383980 | A1 | 11/2011 |

* cited by examiner

*Primary Examiner* — Hung Lam

(74) *Attorney, Agent, or Firm* — Seed IP Law Group PLLC

(57) ABSTRACT

A method for controlling a pixel including at least one photodiode capable of being connected to a sense node, the method including the steps of: a) at the beginning and at the end of a first integration period included within a second integration period, controlling the pixel to transfer the charges stored in the photodiode above a first threshold onto the sense node; and b) at an intermediate time between the beginning of the second period and the beginning of the first period, controlling the pixel to transfer the charges stored in the photodiode above the first threshold onto the sense node.

31 Claims, 3 Drawing Sheets

CMOS PIXEL CONTROL METHOD

BACKGROUND

1. Technical Field

The present disclosure relates to image sensors, including CMOS sensors with a multiple integration period, called high-dynamics sensors, and to methods of controlling pixels of such sensors.

2. Description of the Related Art

A CMOS image sensor pixel essentially comprises a photodiode used in reverse mode, having its junction capacitance discharged by a photocurrent according to a received light intensity. The measurement of the illumination level received by a pixel is performed by measurement of the voltage across the photodiode at selected times, among which the end of a so-called image acquisition or integration period, before and after which the pixel is reset by recharging of its photodiode. The decrease of the voltage across the photodiode during the integration is proportional to the received light intensity. For high light intensities, the photocurrent may be such that the discharge of the junction capacitance during the integration phase adversely affects the measurement. In particular, beyond a given light intensity threshold, which depends on the integration time and on the features of the pixel elements, the photodiode reaches, before the end of the integration time, a so-called saturation discharge level, and brightness differences are no longer discriminated.

To improve the discrimination between the different brightness levels, control methods with a multiple integration period, that is, comprising several read steps at different times of a same integration phase, have been provided. Such methods enable to extend the dynamic range of the sensor, but however have the disadvantage of introducing unwanted noise into the images.

BRIEF SUMMARY

An embodiment provides a method for controlling a CMOS pixel, which facilitates addressing at least some of the disadvantages of existing control methods.

An embodiment provides a multiple integration period control method, which facilitates introducing less unwanted noise into the images than existing methods.

An embodiment provides a method for controlling a pixel comprising at least one photodiode capable of being connected to a sense node, the method comprising the steps of: a) at the beginning and at the end of a first integration period comprised within a second integration period, controlling the pixel to transfer the charges stored in the photodiode above a first threshold onto the sense node; and b) at an intermediate time between the beginning of the second period and the beginning of the first period, controlling the pixel to transfer the charges stored in the photodiode above the first threshold onto the sense node.

According to an embodiment, a time interval substantially equal to the first period separates the intermediate time from the beginning of the first period.

According to an embodiment, the control method further comprises, between the beginning of the second period and the intermediate time, one or several additional pixel control steps to transfer the charges stored in the photodiode above the first threshold onto the sense node.

According to an embodiment, at step a), the pixel is controlled to evacuate towards a power supply rail the charges transferred from the photodiode to the sense node at the beginning of the first integration period.

According to an embodiment, the control method further comprises a step of measurement of information representative of the amount of charges transferred from the photodiode to the sense node at the end of the first integration period.

According to an embodiment, at step b), the pixel is controlled to evacuate towards a power supply rail the charges transferred from the photodiode to the sense node at the intermediate time.

According to an embodiment, the control method further comprises a step of control of the pixel to transfer the charges stored in the photodiode onto the sense node at the end of the second integration period.

According to an embodiment, the control method further comprises a step of measurement of information representative of the amount of charges transferred from the photodiode to the sense node at the end of the second integration period.

According to an embodiment, the photodiode is connected to the sense node via a MOS transistor, and the transfers are controlled by applying a pulse to the transistor gate.

An embodiment provides an image acquisition device, comprising: a plurality of pixels each comprising a photodiode capable of being connected to a sense node; and control circuits configured to control the pixels according to the above-mentioned control method.

A method may comprise: reading a pixel during a first integration period; reading the pixel between an end of the first integration period and an end of a second integration period, the second integration period including the first integration period; reading the pixel after the end of a second integration period; at a beginning and at the end of the first integration period, causing the pixel to transfer charge stored in a photodiode above a first threshold onto a sense node; and at an intermediate time between a beginning of the second integration period and the beginning of the first integration period, causing the pixel to transfer charge stored in the photodiode above the first threshold onto the sense node. A time interval substantially equal to the first integration period may separate said intermediate time from the beginning of the first integration period. The method may include, at least once between the beginning of the second period and said intermediate time, causing the pixel to transfer charge stored in the photodiode above the first threshold onto the sense node. The method may comprises evacuating towards a power supply charge transferred from the photodiode onto the sense node at the beginning of the first integration period. The method may comprise evacuating towards a power supply charge transferred from the photodiode to the sense node at said intermediate time. The method may comprise transferring charge stored in the photodiode onto the sense node at the end of the second integration period. The photodiode may be connected to the sense node via a MOS transistor, and said transfers may be controlled by applying a pulse to a gate of the MOS transistor.

A device may comprise: a read signal generator configured to generate a pixel-read signal to cause a pixel to be read: during a first integration period; between an end of a first integration period and an end of a second integration period, the second integration period including the first integration period; and after the end of the second integration period; and a transfer signal generator configured to generate a pixel-charge-transfer signal at a beginning and at an end of the first integration period, and at an intermediate time between a beginning of the second integration period and the beginning of the first integration period. The device may comprise a reset signal generator configured to generate a pixel-reset signal. The device may comprises an image data generator configured to generate image data based on data received in response to data read signals. The device may comprise a pixel configured to receive the pixel-read signal and the pixel-charge-transfer signal. The pixel-charge-transfer signal may cause the pixel to transfer charge stored in a photodiode above a first threshold onto a pixel sense node. A time interval substantially equal to the first integration period may separate said intermediate time from the beginning of the first integration period. The transfer signal generator may be configured to generate a pixel-charge-transfer signal at least once between the beginning of the second period and said intermediate time. The transfer signal generator may be configured to generate a pixel-charge transfer signal at the end of the second integration period. The device may comprise a pixel, the pixel including a photodiode coupled to a sense node via a MOS transistor, wherein the pixel-charge-transfer signal is a pulse applied to a gate of the MOS transistor.

A system may comprise: a pixel array: a read signal generator configured to generate one or more signals to cause at least one pixel of the pixel array to be read: during a first integration period; between an end of a first integration period and an end of a second integration period, the second integration period including the first integration period; and after the end of the second integration period; and a transfer signal generator configured to generate a pixel-charge-transfer signal to cause at least one pixel of the pixel array to transfer charge stored in a photodiode above a first threshold onto a pixel sense node at a beginning and at an end of the first integration period, and at an intermediate time between a beginning of the second integration period and the beginning of the first integration period. The system may comprise a reset signal generator configured to generate a pixel-reset signal to cause at least one pixel of the pixel array to reset. The system may comprise an image data generator configured to generate image data based on data received from the pixel array in response to data read signals. A time interval substantially equal to the first integration period may separate said intermediate time from the beginning of the first integration period.

A non-transitory computer-readable medium may contain contents to configure a controller to perform a method, the method comprising: reading a pixel during a first integration period; reading the pixel between an end of the first integration period and an end of a second integration period, the second integration period including the first integration period; reading the pixel after the end of a second integration period; at a beginning and at the end of the first integration period, causing the pixel to transfer charge stored in a photodiode above a first threshold onto a sense node; and at an intermediate time between a beginning of the second integration period and the beginning of the first integration period, causing the pixel to transfer charge stored in the photodiode above the first threshold onto the sense node. A time interval substantially equal to the first integration period may separate said intermediate time from the beginning of the first integration period. The method may comprise, at least once between the beginning of the second period and said intermediate time, causing the pixel to transfer charge stored in the photodiode above the first threshold onto the sense node.

A system may comprise: means for reading at least one pixel: during a first integration period; between an end of a first integration period and an end of a second integration period, the second integration period including the first integration period; and after the end of the second integration period; and means for causing the at least one pixel to transfer charge stored in a photodiode above a first threshold onto a pixel sense node at a beginning and at an end of the first integration period, and at an intermediate time between a beginning of the second integration period and the beginning of the first integration period. The system may comprise a pixel array coupled to the means for reading and the means for causing the at least one pixel to transfer charge. The system may comprise means for resetting the at least one pixel. The system may comprise means for generating image data.

The foregoing and other features and advantages will be discussed in detail in the following non-limiting description of specific embodiments in connection with the accompanying drawings.

BRIEF DESCRIPTION OF THE SEVERAL VIEWS OF THE DRAWINGS

For clarity, the same elements have been designated with the same reference numerals in the different drawings unless the context indicates otherwise and, further, the various drawings are not necessarily to scale.

DETAILED DESCRIPTION

In the following description, numerous specific details are given to provide a thorough understanding of embodiments. The embodiments can be practiced without one or more of the specific details, or with other methods, components, materials, etc. In other instances, well-known structures, materials, or operations, such as, for example, transistors, photodiodes, processors, controllers, power supplies, etc., are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" "according to an embodiment" or "in an embodiment" and similar phrases in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
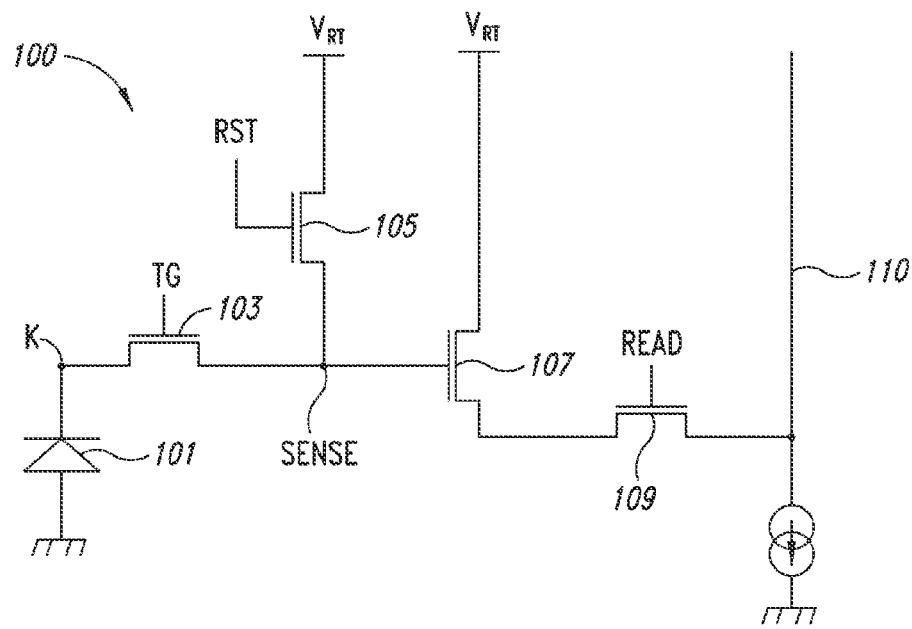
FIG. 1 illustrates an electric diagram of an example of CMOS image sensor pixel.

FIG. 1 illustrates, as an example, an electric diagram of a pixel 100 of a CMOS image sensor. Pixel 100 comprises a photodiode 101 having its anode connected to a reference node, as illustrated a low power supply rail, generally the ground, and having its cathode K, or acquisition node, connected, via a transfer transistor 103, to a sense node SENSE. Sense node SENSE is connected, by a reset transistor 105, to a supply node, as illustrated, a high power supply rail $V_{RT}$. Node SENSE is further connected to the gate of a transistor 107 configured as a follower source. The drain of transistor 107 is connected to high power supply rail $V_{RT}$, and the source of transistor 107 is connected, via a read transistor 109, to a bit line 110 of an array network comprising the pixel. In the shown example, transistors 103, 105, 107, and 109 are N-channel MOS transistors.

FIGS. 2 and 3A to 3C illustrate the operation of an example of a control method with a double integration period, which has been provided to improve the discrimination of brightness levels.

Figure 2:
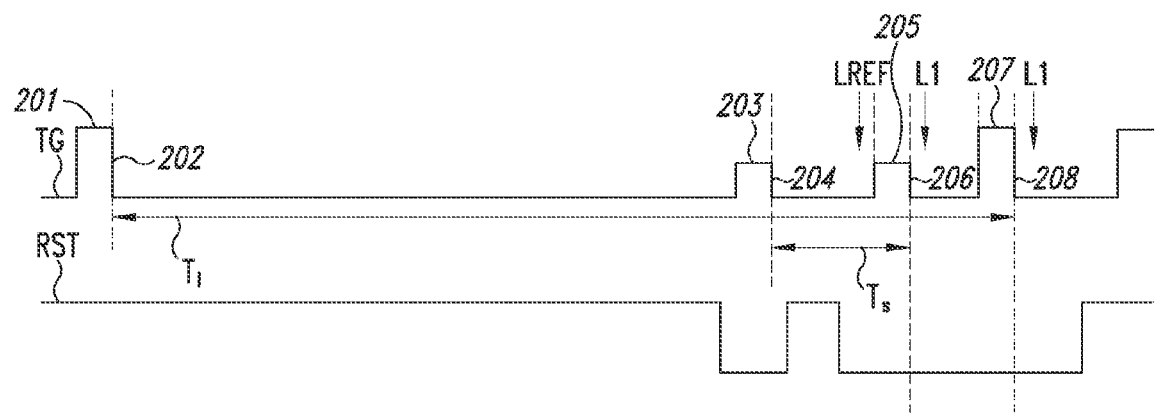
FIG. 2 is a timing diagram illustrating the variation of signals for controlling the pixel of FIG. 1, according to an example of control method with a double integration period.

FIG. 2 is a timing diagram illustrating the variation of control signals TG and RST respectively applied to the gate of transfer transistor 103 and to the gate of reset transistor 105 of pixel 100 of FIG. 1.

Before the beginning of the integration, signal RST is set to a high state, which causes the setting of the voltage of sense node SENSE to high power supply voltage $V_{RT}$. Transfer signal TG is then set to a high voltage $V_{HTG}$, for example, equal to 2.8 V, during a first pulse 201, or initialization pulse. This causes the transfer of all the charges stored in photodiode 101 to sense node SENSE, and their evacuation towards the high power supply rail via transistor 105. The voltage across photodiode 101 then becomes equal to the natural voltage of the diode, which results from the doping levels, for example, on the order of 1.5 V.

Falling edge 202 of pulse 201 marks the beginning of the integration phase, or long integration period $T_l$. At the beginning of the integration phase, acquisition node K is isolated from sense node SENSE (signal TG in the low state), and sense node SENSE is connected to high power supply voltage $V_{RT}$ (signal RST in the high state). The electric charges generated in photodiode 101 under the effect of light cause a progressive decrease of the voltage of acquisition node K.

After some time, reset signal RST is set to the low level, after which transfer signal TG is set to a high state during a second pulse 203, or skimming pulse, at a voltage $V_{MTG}$ lower than voltage $V_{HTG}$ of first pulse 201, for example, at a 1.4-V voltage. If, during the second pulse, the voltage of acquisition node K is at a level lower than $V_{MD}=V_{MTG}-V_{thTG}$, where $V_{thTG}$ is the threshold voltage of transistor 103, a current flows through transistor 103 during the second pulse, from node SENSE to node K, and the voltage of node K is taken back to $V_{MD}$. Node SENSE being isolated from high power supply rail $V_{RT}$ (signal RST in the low state), the voltage of node SENSE decreases accordingly. If, however, during the second pulse, the voltage at node K is greater than $V_{MD}$, no current flows through transistor 103 and the voltages of node K and of node SENSE remain unchanged. After second pulse 203, signal RST is set back to the high state, which resets the voltage of node SENSE to high power supply voltage $V_{RT}$. In other words, if, during the second pulse, the amount of photogenerated charges stored in the photodiode exceeds an intermediate threshold, set by voltage $V_{MD}$ to a level lower than the pixel saturation level, the excess charges (above this intermediate threshold) are transferred to sense node SENSE via transistor 103, and then evacuated towards high power supply rail $V_{RT}$ via transistor 105.

Falling edge 204 of second pulse 203 marks the beginning of a short integration period $T_s$, comprised within long integration period $T_l$, during which the voltage across the photodiode keeps on decreasing proportionally to the amount of light received by the pixel. At an intermediate time of the short integration period, signal RST is set to a low state to isolate sense node SENSE from high power supply rail $V_{RT}$. The voltage of node SENSE is then read, as illustrated by arrow LREF of FIG. 2, for example by turning on read transistor 109 to transfer the voltage of node SENSE towards the pixel output via transistor 107 assembled as a follower source.

Voltage $V_{LREF}$ read at step LREF is stored and forms a reference for subsequent steps of measurement of the photodiode discharge level.

At the end of short integration period $T_s$, a third pulse 205, or first read pulse, of same voltage level $V_{MTG}$ as second pulse 203, is applied to signal TG. If, during the third pulse, the voltage at acquisition node K is at a level lower than $V_{MD}$, a current flows through transistor 103, taking the voltage of node K back to level $V_{MD}$. Node SENSE being isolated from high power supply rail $V_{RT}$ (signal RST in the low state), the voltage of node SENSE decreases accordingly. If, however, during the third pulse, the voltage of node K is greater than $V_{MD}$, the voltage of K and the voltage of node SENSE remain unchanged. In other words, if, during the third pulse, the amount of charges stored in the photodiode exceeds the intermediate threshold set by voltage $V_{MD}$, the excess charges are transferred to sense node SENSE, and the voltage of node SENSE decreases by a value proportional to the amount of transferred charges. Falling edge 206 of the third pulse marks the end of short integration period $T_s$. After the end of pulse 205, the voltage at node SENSE is read, as indicated by arrow L1 of FIG. 2.

After read step L1, a fourth pulse 207, or second read pulse, is applied to signal TG, at a voltage equal to voltage $V_{HTG}$ of first pulse 201, for example, 2.8 V. This causes the transfer to sense node SENSE of all the photogenerated charges remaining in photodiode 101. The voltage of node SENSE, which has not been reset after first read pulse 205, decreases by a value proportional to the transferred amount of charges. After falling edge 208 of the fourth pulse, which marks the end of long integration period $T_l$, the voltage of sense node SENSE is read, as indicated by arrow L2 of FIG. 2.

Calling $V_{L1}$ the voltage read at step L1, and $V_{L2}$ the voltage read at step L2, the final output value of the pixel is equal to the maximum value between $V_{LREF}-V_{L2}$ and $(V_{LREF}-V_{L1})*(T_l/T_s)$.

In practice, to optimize the reading of the pixels and minimize the necessary amount of memory, it may be provided to associate with each pixel or with each pixel line or column of the sensor, in addition to the elements shown in FIG. 1, additional components enabling, during read steps L1 and L2, to read the voltage of node SENSE differentially with respect to voltage $V_{LREF}$ measured at step LREF, to directly provide values $V_{LREF}-V_{L1}$ and $V_{LREF}-V_{L2}$. Additional components enabling to compare values $V_{LREF}-V_{L2}$ and $(V_{LREF}-V_{L1})*(T_l/T_s)$ immediately at the pixel output may also be provided, to only sample and store the final pixel output value in the memory.

After read step L2, the pixel is reset for a new integration phase.

Figure 3A:
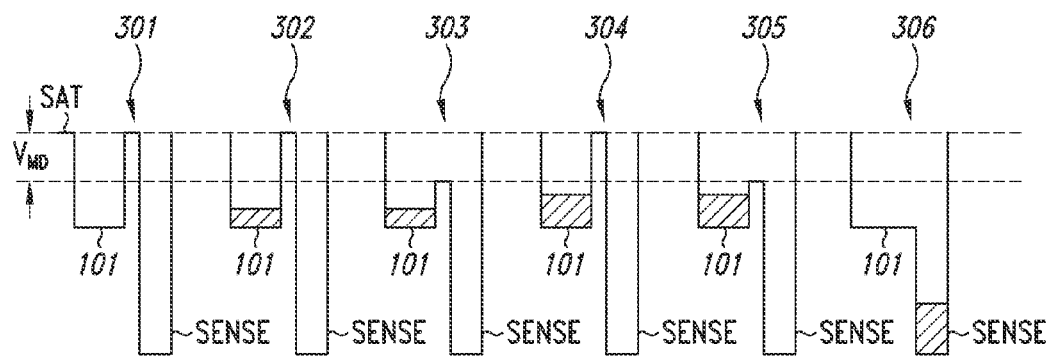
FIGS. 3A to 3C schematically illustrate charge transfers from a photodiode to a sense node of the pixel of FIG. 1, when this pixel is controlled according to the method of FIG. 2.
Figure 3B:
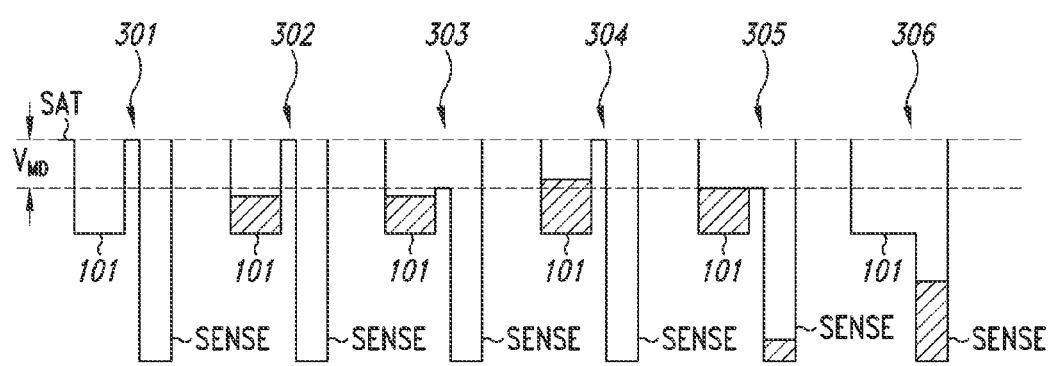
Figure 3C:
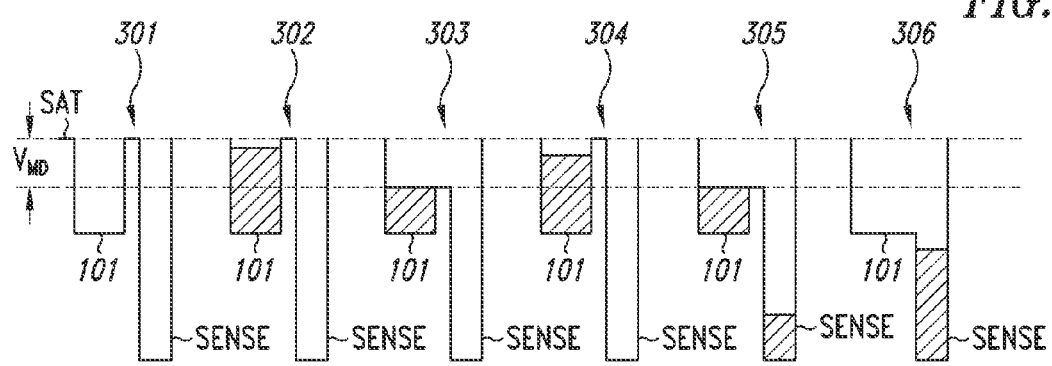

FIGS. 3A to 3C schematically illustrate charge transfers from acquisition node K to sense node SENSE of pixel 100 of FIG. 1, when the pixel is controlled according to the method of FIG. 2. FIGS. 3A, 3B, and 3C show the transfers respectively in the case of a low illumination, in the case of a medium illumination, and in the case of a strong illumination.

At a time 301 of beginning of long integration period $T_l$, for example, immediately after initialization pulse 201, photodiode 101 and sense node SENSE contain no photogenerated charges.

At an intermediate time 302 of long integration period $T_l$, for example, just before skimming pulse 203, photodiode 101 contains an amount of photogenerated charges proportional to the light intensity received by the pixel from the beginning of the integration.

At a time 303 corresponding to the setting back to the high state of signal RST, just after the end of skimming pulse 203

(or beginning of short integration period $T_s$), the charges stored in the photodiode above the intermediate threshold determined by voltage $V_{MD}$, transferred to sense node SENSE during pulse 203, are evacuated to high power supply rail $V_{RT}$. In this example, as respectively shown in FIGS. 3A, 3B, and 3C, no charge is evacuated in the case of low or medium illuminations and charges are evacuated in the case of the strong illumination.

At a time 304 close to the end of short integration period $T_s$, for example, just before first read pulse 205, photogenerated charges stored in the photodiode during the short integration period add to the charges remaining in the photodiode after the application of skimming pulse 203. The amount of new photogenerated charges is proportional to the light intensity received from the beginning of short integration period $T_s$.

At a time 305 of end of short integration period $T_s$ (or end of first read pulse 205), the charges stored in the photodiode above the intermediate threshold set by voltage $V_{MD}$, are transferred to sense node SENSE. Node SENSE being isolated from high power supply voltage $V_{RT}$, the transferred charges remain stored on node SENSE. The voltage of node SENSE thus decreases by a value proportional to the transferred amount of charges. In this example, as respectively shown in FIGS. 3A, 3B, and 3C, no charge is transferred to node SENSE in the case of the low illumination and charges are transferred in the case of medium or strong illuminations. The voltage of node SENSE is then measured (read step L1 of FIG. 2), which provides information representative of the transferred amount of charges.

At a time 306 of end of long integration period $T_l$ (or end of second read pulse 207), all the charges remaining in the photodiode are transferred to sense node SENSE. Since node SENSE is isolated from high power supply voltage $V_{RT}$ and has not been reset after first read pulse 205, if charges have been transferred to node SENSE during the application of pulse 205, the charges transferred during pulse 207 add to the charges transferred during pulse 205. The voltage of node SENSE decreases proportionally to the amount of charges transferred during pulse 207. The voltage at node SENSE is then measured (read step L2 of FIG. 2), which provides information representative of the transferred amount of charges.

By providing two different read steps within a same integration phase, the control method of FIG. 2 enables to improve the brightness level discrimination and accordingly to extend the dynamic range of the sensor. This method however has the disadvantage of introducing unwanted noise into images.

Studies carried out by the inventors have shown that this noise results, at least partly, from the fact that the pixel does not exactly behave in the same way during skimming pulse 203 and during first read pulse 205. In particular, the intermediate threshold beyond which the charges accumulated in the photodiode are evacuated during skimming pulse 203, and the intermediate threshold beyond which the charges stored in the photodiode are transferred to the sense node during first read pulse 205, are not always the same and this, despite the fact that pulses 203 and 205 have the same amplitude $V_{MTG}$. This results in a poor linearity in the variation of the pixel output value according to the received light intensity, which generates unwanted noise in the image, especially in the sensor areas receiving a brightness ranging from medium to strong. The inventors has especially found that, in pixels receiving a medium to strong brightness (and generally in pixels where skimming pulse 203 effectively causes the evacuation of part of the charges stored in the photodiode), the amount of charges remaining in the photodiode after the application of a pulse 203 or 205 depends on the amount of charges contained in the photodiode just before the pulse. Now, in practice, skimming pulse 203 generally occurs in the final portion of long integration period $T_s$. Thus, in cases of medium to strong exposure, the photodiode may be strongly saturated at the time when skimming pulse 203 is applied. Conversely, period $T_s$ being relatively short, the photodiode is generally not saturated at the time when first read pulse 205 is applied (except in case of a very high light intensity). This difference in the photodiode discharge state just before the application of pulses 203 and 205 results in that the amount of charges stored in the photodiode at the beginning of short integration period $T_s$ does not always exactly correspond to the amount of charges remaining in the photodiode after first read pulse 205, which causes the above-mentioned poor linearity.

Figure 4:
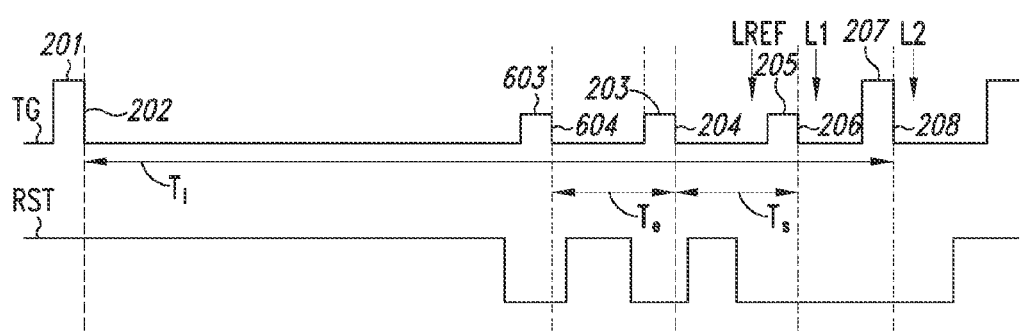
FIG. 4 is a timing diagram illustrating the variation of signals for controlling the pixel of FIG. 1, according to an embodiment of control method with a double integration period.

FIG. 4 is a timing diagram illustrating the operation of an embodiment of a control method with a double integration period. FIG. 4 more specifically illustrates the variation of control signals TG and RST respectively applied to the gate of transfer transistor 103 and to the gate of reset transistor 105 of pixel 100 of FIG. 1.

The method of FIG. 4 is very similar to the method of FIG. 2. In particular, in the shown example, signal TG comprises the same pulses as in the example of FIG. 2, that is, an initialization pulse 201 at the beginning of a long integration period $T_l$, a skimming pulse 203 at the beginning of a short integration period $T_s$ comprised within long integration period $T_l$, a first read pulse 205 at the end of short integration period $T_s$, and a second read pulse 207 at the end of long integration period $T_l$.

The method of FIG. 4 differs from the method of FIG. 2 in that signal TG further comprises, after the beginning of long integration period $T_l$ but before skimming pulse 203, an intermediate skimming pulse 403, at the same voltage $V_{MTG}$ as pulses 203 and 205, for example 1.4 V.

In the shown example, signal RST is set to the low state just before intermediate skimming pulse 403, and is then set back to the high state just after pulse 403. For the rest, in this example, the variation of signal RST is the same as in the example of FIG. 2.

If, during intermediate skimming pulse 403, the voltage of acquisition node K is at a level lower than $V_{MD}=V_{MTG}-V_{thTG}$, the voltage of node K is taken back to $V_{MD}$, and the voltage of node SENSE decreases accordingly. If, however, during pulse 403, the voltage of node K is greater than $V_{MD}$, the voltages of node K and of node SENSE remain unchanged. After pulse 403, signal RST is set back to the high state, which resets the voltage of node SENSE to high power supply voltage $V_{RT}$. In other words, if, during pulse 403, the amount of photogenerated charges stored in the photodiode exceeds the intermediate threshold set by voltage $V_{MD}$, the excess charges are transferred to sense node SENSE by transistor 103, and are then evacuated towards high power supply rail $V_{RT}$ by transistor 105.

Pulse 403 does not mark the beginning or the end of an integration period and is associated to no step of reading of the voltage of node SENSE but, except in cases of extreme brightness, enables the photodiode not to be saturated at the starting of skimming pulse 203 marking the beginning of short integration period $T_s$. As a result, the pixel substantially behaves in the same way during the application of skimming pulse 203 and during the application of first read pulse 205. In particular, the provision of pulse 403 enables, in cases of a medium to strong brightness, to match at best the amount of charges remaining in the photodiode just after skimming pulse 203 and the amount of charges remaining in the photodiode just after first read pulse 205. This enables to suppress the above-mentioned linearity problems, and accordingly the parasitic noise introduced into the image.

Preferably, the time interval separating intermediate skimming pulse 403 from skimming pulse 203 is on the order of the duration of short integration period $T_s$. As a result, except in the case of a significant variation of the light intensity during the integration, the amount of photogenerated charges stored in the photodiode between pulse 403 and pulse 203 is substantially identical to the amount of photogenerated charges stored between pulse 203 and pulse 205. This enables to match at best the behaviors of the pixel during skimming pulse 203 and during first read pulse 205. As an example, duration $T_e$ between falling edge 404 of intermediate skimming pulse 403 and falling edge 204 of skimming pulse 203 may range between 0.8 and 1.2 times short integration period $T_s$, and may be equal to period $T_s$.

In an alternative embodiment, to further improve the linearity between the final output value of the pixel and the received light intensity, other intermediate skimming pulses (not shown) may be provided before pulse 403, at the same amplitude level $V_{MTG}$ as pulses 403, 203, and 205. As an example, intermediate skimming pulses may be provided all along the period comprised between the beginning of long integration period $T_l$ and pulse 403, spaced apart from one another by a time period substantially equal to short integration period $T_s$.

Figure 5:
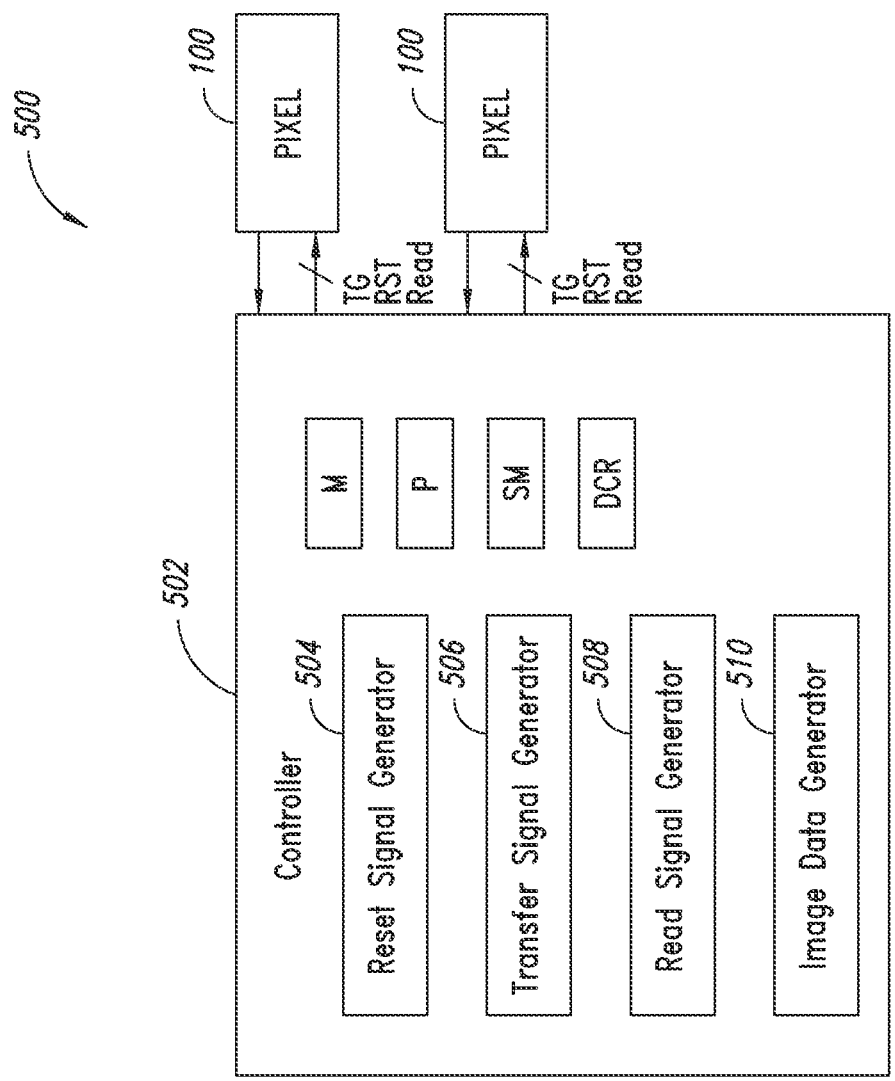
FIG. 5 is a functional block diagram of a pixel sensor system.

FIG. 5 illustrates an embodiment of a system 500 comprising one or more CMOS pixels 100 coupled to a controller 502. The controller 502 may be configured to generate control signals to control one or more pixels in accordance with one or more of the methods disclosed herein. The controller comprises a reset signal generator 504 configured to generate one or more reset signals to control one or more pixels 100, a transfer signal generator 506 configured to generate one or more transfer signals to control one or more pixels 100, a read signal generator 508 configured to generate one or more read signals to control one or more pixels 100, and an optional image data generator 510 configured to generate image data based on information received from one or more pixels. The controller 502 may comprise, for example, one or more memories M, one or more processors P, one or more state machines SM, discrete circuitry DCR (e.g., logic gates, multipliers, etc.), etc., and various combinations thereof, configured to implement the generators of the controller 502, e.g., configured to generate signals to control the CMOS pixels 100, such as signals TG, RST and READ, and to process outputs generated by the pixels 100, such as outputs on bit line 110.

Some embodiments may take the form of computer program products. For example, according to one embodiment there is provided a computer readable medium comprising a computer program adapted to perform one or more of the methods described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the systems and/or modules may be implemented or provided in other manners, such as at least partially in firmware and/or hardware, including, but not limited to, one or more application-specific integrated circuits (ASICs), state machines, discrete circuitry, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology. In some embodiments, some of the modules or controllers separately described herein may be combined, split into further modules and/or split and recombined in various manners.

The systems, modules and data structures may also be transmitted as generated data signals (e.g., as part of a carrier wave) on a variety of computer-readable transmission mediums, including wireless-based and wired/cable-based mediums.

Example embodiments have been described. Various alterations, modifications, and improvements will readily occur to those skilled in the art.

In particular, the present disclosure is not limited to the pixel example described in relation with FIG. 1. It will occur to those skilled in the art that the method described in relation with FIG. 4, as well as the method described in relation with FIG. 2, may be adapted to any CMOS pixel comprising a photodiode capable of being connected to a sense node.

Further, in the above-described examples, signal RST is set to the low state during skimming pulse 203 and intermediate skimming pulse 403. This enables to ascertain that the conditions of use of the pixel are the same during skimming phases (pulses 403 and 203) and during the first read phase (pulse 205), and thus to minimize linearity problems. As a variation, it may be provided to leave signal RST in the high state during pulses 403 and 203. In this case, the charges transferred to node SENSE during skimming phases 403 and 203 are evacuated towards high power supply rail $V_{RT}$, without waiting for the end of the skimming phase.

Further, the present disclosure is not limited to the specific case described in relation with FIG. 4 where the pixel is controlled according to a double integration period method. It will be within the abilities of those skilled in the art to adapt the provided method to the case of a multiple integration period control comprising more than two read steps at different times of a same integration phase, different skimming levels being provided for the different read steps.

Such alterations, modifications, and improvements are intended to be part of this disclosure, and are intended to be within the spirit and the scope of the present disclosure. Accordingly, the foregoing description is by way of example only and is not intended to be limiting.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:
1. A method, comprising:
  reading a pixel during a first integration period;
  reading the pixel between an end of the first integration period and an end of a second integration period, the second integration period including the first integration period;

reading the pixel after the end of a second integration period;

at a beginning and at the end of the first integration period, causing the pixel to transfer charge stored in a photodiode above a first threshold onto a sense node; and at an intermediate time between a beginning of the second integration period and the beginning of the first integration period, causing the pixel to transfer charge stored in the photodiode above the first threshold onto the sense node.

2. The method of claim 1 wherein a time interval substantially equal to the first integration period separates said intermediate time from the beginning of the first integration period.

3. The method of claim 1, further comprising, at least once between the beginning of the second period and said intermediate time, causing the pixel to transfer charge stored in the photodiode above the first threshold onto the sense node.

4. The method of claim 1, comprising evacuating towards a power supply charge transferred from the photodiode onto the sense node at the beginning of the first integration period.

5. The method of claim 1, comprising evacuating towards a power supply charge transferred from the photodiode to the sense node at said intermediate time.

6. The method of claim 1, comprising transferring charge stored in the photodiode onto the sense node at the end of the second integration period.

7. The method of claim 1 wherein the photodiode is connected to the sense node via a MOS transistor, and wherein said transfers are controlled by applying a pulse to a gate of the MOS transistor.

8. The method of claim 1, comprising determining an output of the pixel based on the reading of the pixel during the first integration period, the reading of the pixel between the end of the first integration period and the end of the second integration period, and the reading of the pixel after the end of the second integration period.

9. The method of claim 1, comprising, at the beginning of the second integration period, transferring charge stored in the photodiode onto the sense node and evacuating the transferred charge towards a power supply.

10. A device, comprising:
a read signal generator configured to generate a pixel-read signal to cause a pixel to be read:
during a first integration period;
between an end of a first integration period and an end of a second integration period, the second integration period including the first integration period; and
after the end of the second integration period; and
a transfer signal generator configured to generate a pixel-charge-transfer signal at a beginning and at an end of the first integration period, and at an intermediate time between a beginning of the second integration period and the beginning of the first integration period.

11. The device of claim 10, comprising a reset signal generator configured to generate a pixel-reset signal.

12. The device of claim 11, comprising an image data generator configured to generate image data based on data received in response to pixel-read signals.

13. The device of claim 10, comprising a pixel configured to receive the pixel-read signal and the pixel-charge-transfer signal.

14. The device of claim 13 wherein the pixel-charge-transfer signal causes the pixel to transfer charge stored in a photodiode above a first threshold onto a pixel sense node.

15. The device of claim 10 wherein a time interval substantially equal to the first integration period separates said intermediate time from the beginning of the first integration period.

16. The device of claim 10 wherein the transfer signal generator is configured to generate a pixel-charge-transfer signal at least once between the beginning of the second period and said intermediate time.

17. The device of claim 10 wherein the transfer signal generator is configured to generate a pixel-charge transfer signal at the end of the second integration period.

18. The device of claim 10 comprising a pixel, the pixel including a photodiode coupled to a sense node via a MOS transistor, wherein the pixel-charge-transfer signal is a pulse applied to a gate of the MOS transistor.

19. The device of claim 10 wherein the transfer signal generator is configured to generate a pixel-charge transfer signal at the beginning of the second integration period.

20. The device of claim 12 wherein the image data generator is configured to generate a pixel output signal based on data received in response to:
the pixel-read signal generated during the first integration period;
the pixel-read signal generated between the end of the first integration period and the end of the second integration period; and
the pixel-read signal generated after the end of the second integration period.

21. A system, comprising:
a pixel array:
a read signal generator configured to generate one or more signals to cause at least one pixel of the pixel array to be read:
during a first integration period;
between an end of a first integration period and an end of a second integration period, the second integration period including the first integration period; and
after the end of the second integration period; and
a transfer signal generator configured to generate a pixel-charge-transfer signal to cause at least one pixel of the pixel array to transfer charge stored in a photodiode above a first threshold onto a pixel sense node at a beginning and at an end of the first integration period, and at an intermediate time between a beginning of the second integration period and the beginning of the first integration period.

22. The system of claim 21, comprising a reset signal generator configured to generate a pixel-reset signal to cause at least one pixel of the pixel array to reset.

23. The system of claim 21, comprising an image data generator configured to generate image data based on data received from the pixel array in response to data read signals.

24. The system of claim 21 wherein a time interval substantially equal to the first integration period separates said intermediate time from the beginning of the first integration period.

25. A non-transitory computer-readable medium whose contents configure a controller to perform a method, the method comprising:
reading a pixel during a first integration period;
reading the pixel between an end of the first integration period and an end of a second integration period, the second integration period including the first integration period;
reading the pixel after the end of a second integration period;

at a beginning and at the end of the first integration period, causing the pixel to transfer charge stored in a photodiode above a first threshold onto a sense node; and at an intermediate time between a beginning of the second integration period and the beginning of the first integration period, causing the pixel to transfer charge stored in the photodiode above the first threshold onto the sense node.

26. The non-transitory computer-readable medium of claim 25 wherein a time interval substantially equal to the first integration period separates said intermediate time from the beginning of the first integration period.

27. The non-transitory computer-readable medium of claim 25 wherein the method comprises, at least once between the beginning of the second period and said intermediate time, causing the pixel to transfer charge stored in the photodiode above the first threshold onto the sense node.

28. A system, comprising:

means for reading at least one pixel:

during a first integration period;

between an end of a first integration period and an end of a second integration period, the second integration period including the first integration period; and after the end of the second integration period; and means for causing the at least one pixel to transfer charge stored in a photodiode above a first threshold onto a pixel sense node at a beginning and at an end of the first integration period, and at an intermediate time between a beginning of the second integration period and the beginning of the first integration period.

29. The system of claim 28, further comprising a pixel array coupled to the means for reading and the means for causing the at least one pixel to transfer charge.

30. The system of claim 28, comprising means for resetting the at least one pixel.

31. The system of claim 28, comprising means for generating image data.

* * * * *